Feb. 21, 1956     A. L. TIRICO     2,735,953
RADIATION DETECTOR
Filed March 28, 1952
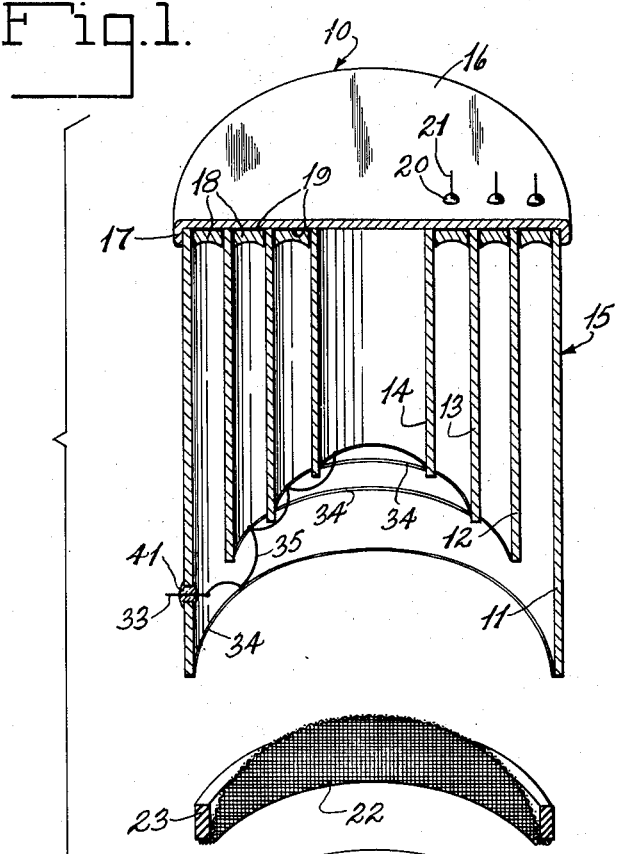
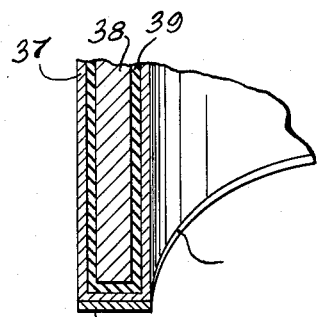
Fig.2.
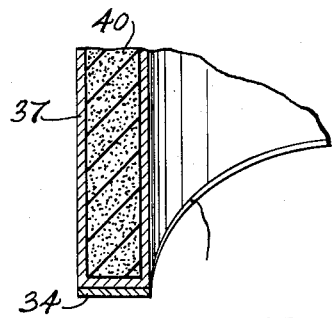
Fig.3.
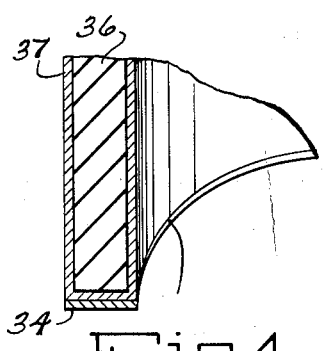
Fig.4.
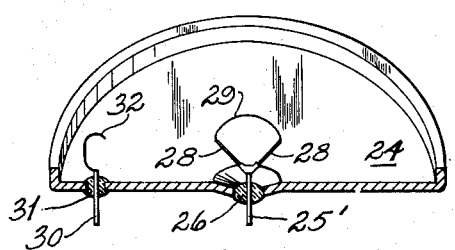
Fig.5.
INVENTOR.
ARTHUR L. TIRICO
BY
ATTORNEY

United States Patent Office 2,735,953
Patented Feb. 21, 1956

2,735,953

RADIATION DETECTOR

Arthur L. Tirico, Glen Ridge, N. J., assignor to The Texas Company, New York, N. Y., a corporation of Delaware Application March 28, 1952, Serial No. 278,993

11 Claims. (Cl. 313—93)

This invention relates to improvements in Geiger-Mueller radiation detectors and in particular to the types thereof variously known as multiple plate detectors. As is known these detectors have much higher efficiencies for the detection of penetrative radiation such as gamma rays than the original or prototype Geiger-Mueller tubes. A brief review of why this is so will be helpful in understanding the objects of the present invention and how they are attained.

In a proto-type Geiger-Mueller tube a single cylindrical cathode is used which is usually positioned, during operation, with its curved outer surface facing broadside to the source of radiation. As a result the great majority of the impinging penetrative photons never get to be detected. Either one or both of two causes may be responsible for each failure of a photon of radiation to be detected: (1) it may simply fail to become involved in an interaction within the cathode, and therefore fail to produce the charged particle needed for ionizing the gas filling of the tube if a current pulse is to be produced, and/or (2) the charged-particle by-product of an interaction which does take place may fail to escape from the cathode into the gas filled interior of the tube. It comes about primarily in the first way because the cathode walls are so thin that an impinging photon of penetrative radiation is very likely to go right through the entire tube without having an interaction. Nor does the presence of a large volume of gas within the tube improve matters to any substantial degree since interactions occur in substantial numbers only in dense materials. Thus, incidentally, it should be borne in mind that the gas, which is so essential for the counting mechanism, i. e., for the gas amplification afforded by Townsend avalanches, is of substantially no significance in contributing to the total number of interactions. It comes about primarily in the second way because the cathode wall is so thick that an interaction which does take place is very likely to occur therein at a greater distance from the interior surface thereof than the penetrative range of the charged-particle(s) released due to the interaction. In other words charged-particle by-products of "interactions" have very limited capability for penetration as compared to photons of "penetrative radiation" which produce them. From the foregoing it will be seen that there is no possible wall thickness for these tubes at which high detection efficiencies will be achieved. All that can be hoped for is to avoid such extremely poor efficiencies that use of the tubes is impractical.

Multiple plate detectors have provided a great increase in detection efficiency by the use of stacked arrays of wafer-like cathode elements whose exposure to radiation is successive, where it is directed at their surfaces, and is deep, where it is directed at their edges. Thus a gamma ray which impinges on an end of the stack will have repeated (though individually poor) opportunities to interact in thin elements from which charged-particle by-products can easily escape whereas one which enters an edge of any one of the cathode elements or penetrates one of its sides at a very small grazing angle, will have a single (but a very excellent) opportunity to interact due to its continuous long path through dense material, and even its charged-particle by-product(s) will have quite a good chance of escaping. This is because very often such particles will move off from the interaction points in entirely different directions than extrapolations of the paths of the radiation which produced them, i. e., they will often move off in directions having large components at right angles to the exposed surfaces of the cathode element, and therefore they will be able to escape without being highly penetrative. Therefore multiple plate detectors have offered a type of structure which results in an increase in the percentage of interactions and at the same time permits a high percentage of the ionizing charged particles produced by the interactions to escape into the gas.

In order to provide the stacks of wafer-like elements with large total edgewise areas of exposure, e. g., like the broadside areas afforded by the outer surfaces of the cylindrical cathodes of proto-type Geiger-Mueller tubes, each of them usually includes a plurality of the elements in close-spaced relationship. As an overall result the multiple plate type detectors include, by volume, much higher percentages of solid materials than was ever possible in the proto-type Geiger-Mueller tubes.

In addition to the occurrence of an interaction within the cathode, and of the escape of one or more ionizing charged particles from the point of interaction into the gas filling of the tube, one more occurrence is necessary to complete the detection of an intercepted photon of radiation. It is that the charged particle(s) bring about a Townsend avalanche. To do this, it (or they) must ionize one or more atoms of the gas, i. e., produce secondary electrons, in a region within the tube where a sufficient accelerating gradient exists to start an avalanche of ionization. In proto-type Geiger-Mueller tubes this last requirement is met almost automatically, in most cases, because all parts of the interior surfaces of their cathodes are directly exposed to their centrally located anodes. Therefore any negative charged particle which escapes into the interior of the tube and/or any secondary electron which it produces by ionization has a very great likelihood of being accelerated toward the anode. In multiple plate detectors, special physical and electrical arrangements have been devised to meet this requirement. The physical arrangements afford unimpeded discharge paths to an anode from all regions, adjacent the surfaces of the cathode elements, into which charged particles are likely to escape. For example in many of these arrangements each of one or more fine wire anodes extends in perpendicular relationship to the surfaces of the cathode elements, such as through a row of aligned holes formed respectively therein, the elements being positioned in alignment and adjacent to each other, though slightly spaced apart, to make this possible. Thus both surfaces of each element can "see" exposed portions of an anode along straight lines which are unobstructed by any part of any other cathode element. A simple example of such an arrangement is one in which each of the cathode elements is a circular disc having a small central aperture; the discs are arranged with their perimeters and apertures in alignment and their surfaces in a parallel spaced relationship; and a single fine wire anode extends through the center of the aligned row of apertures.

The electrical arrangements provide the detector with means which are effective independently of the anode(s) to provide in region(s) into which charged particles are likely to escape and in which their secondaries are likely to be produced, e. g., the thin inter-element spaces of the multiple plate cathode array, stronger collecting fields than those which normally would be provided therein as a result of the potential applied between the cathode and the fine-wire anode(s). This is very useful since, as is known, the very great concentration of the available anode-to-cathode field about a Geiger-Mueller anode causes the gradients which exist near to portions of the cathode structure to be relatively very low. According to a method which is disclosed in the co-pending application of Gerhard Herzog, Ser. No. 271,544, filed February 14, 1952, the required collecting fields are established in the regions in question by forcing direct currents through or along the surfaces of the cathode elements radially outward from the edges of their apertures to produce gradients which extend along and between the electrodes as far as desired, whereby escaped charged particles and/or their secondaries are forcibly drawn from these regions and projected into the field(s) of the anode(s) wherein they receive their final acceleration for producing Townsend avalanches. According to another method disclosed by Raymond J. Ruble in co-pending application, Ser. No. 262,029, filed December 17, 1951, a similar end is attained by the use of one or more auxiliary electrodes such as a "pre-accelerator" and/or a "reflector."

Experience has repeatedly shown that the stacked-array, multiple-plate type of G. M. tube has lower detection efficiencies for certain kinds of penetrative radiation, and in particular for "natural" gamma radiation, when it impinges on one of the tube's sides than when it impinges on one of its ends, apparently due to a lower escape incidence of the charged-particle by-products. The reason for this is that, while, as stated above, the charged particle(s) do, indeed, often move off from the interaction point in directions markedly different than an extrapolation of the path of the penetrative radiation which produced them, yet even more often certain of them, such as the kind of charged particles, "Compton" electrons, which are most often produced by the interactions of natural gamma rays, will move off in directions which are not markedly different than said extrapolation (see Fig. 6.5 on page 150 in the book, "Radioactivity and Nuclear Physics" written by James M. Cork and published in 1947 by the D. Van Nostrand Co. Inc.). Thus where natural gamma rays impinge on an end of the tube the charged particles which are produced by their interactions most often move off from the interaction points in directions affording them easiest escape paths from the stacked cathode elements whereas the converse is true where the impingement is on a side of the tube.

For certain purposes this is not particularly important. For example, in medical uses of multiple plate detectors the operator is free to orient the instrument with respect to the source of radiation so as to obtain the highest efficiency. For other purposes this characteristic of multiple plate detectors has proven to be disadvantageous. For example, when such a detector is used in logging a bore hole the geometry of the hole and of the logging tool virtually necessitate mounting the detector so that the impingement of radiation is against its sides. From the foregoing it would seem advantageous to provide multiple-plate detector cathode-arrays comprising concentric cylinders rather than stacked planar elements. In fact some such detectors have already been proposed in the past. In some instances foraminous cathode cylinders were proposed to permit charged particles to move from the inner surfaces of outer ones through the walls of intermediate ones to reach the central anode wire, i. e., to avoid physical blocking of the paths of charged particles, and with this was proposed the use of cascade polarization of the successive cylinders to overcome the loss of the anode field for some of the cathode cylinders due to the electrostatic shielding effects of the others. This type of arrangement does not provide a very high density cathode array because of the open type of structure which is required for all of the intermediate cathode elements. Therefore its increased escape incidence is off-set by a decrease in interaction incidence. In other instances it was proposed to use solid concentric cylinders and to avoid physical blocking and electrical shielding by the use of multiple anodes strung between adjacent pairs of the cylinders in directions parallel to the axis of the array. These detectors have the disadvantage of entailing considerable stray capacitance between the total effective cathode and anode areas and of therefore reducing the maximum counting rate.

It is an object of the present invention to devise improvements in multiple plate detectors whereby they will have increased, and possibly their highest, counting efficiencies for radiation which impinges on their sides.

It is a further object to attain the object set forth above by devising multiple plate detectors employing cathode arrays of concentric cylinders but without entailing the above-described disadvantages of prior art detectors employing such arrays.

In general these objects are attained by the use of a cathode array of solid concentric cylinders in combination with means for pre-accelerating charged particles which are produced within the array along the inter-element spaces thereof in axial directions toward an end of the detector where they may be attracted by the non-linear, Geiger-Mueller field of a small-area, e. g., a punctaform or tiny arcuate, anode after emerging from the array. This arrangement avoids the use of foraminous concentric elements and also the use of multiple anodes.

In the drawing:

Fig. 1 represents an exploded longitudinal sectional view of a multiple plate Geiger-Mueller detector embodying the present invention;

Figs. 2–4 represent very much enlarged cross-sectional views of fragmentary portions of types of cathode elements which are suitable for use in the detectors shown herein; and Fig. 5 is a sectional view of a modification of a portion of the embodiment shown in Fig. 1.

The detector 10 shown in Fig. 1 comprises a plurality of cylindrical cathode elements 11—14 assembled together in co-axial relationship to form a unitary cathode array with the outer cathode element 11 acting as the side wall of the detector envelope 15. The top end of the envelope 15, as it appears in the drawing, is closed by a flat circular cover 16 having a lip 17 which fits snugly about the outside surface of the top end of the element 11 and to which it is hermetically sealed in any suitable way such as by welding or silver-soldering. The top ends of all of the cathode elements terminate near to the inside surface of the cover 16 so that at the top of the cathode array all of their ends are substantially co-planar. However all the elements have appropriately different lengths so that their respective bottom ends terminate near an imaginary surface of revolution of the inside edge of the bottom end of the element 11. It is not intended that all of the structural features herein described in detail be considered essential in reducing the present invention to practice but rather that they are probably particularly suitable and desirable for preferred embodiments. Thus the top and bottom ends of the elements 11—14 need not necessarily terminate on flat and spherical surfaces in the manner described above. For example the bottom ends may equally well terminate on an imaginary flat surface without this necessitating any other changes in the detector 10 (such as a change in the shape of its anode) or on the surface of an imaginary cylinder whose axis is transverse to that of the array (in which case it would be possible to replace the punctaform anode of the detector 10 of Fig. 1 with a fine-wire anode disposed along the axis of the imaginary cylinder).

One reason for selecting the particular geometry shown in Fig. 1 is that it provides a substantially symmetrical Geiger-Mueller electrical field distribution in the discharge region, a characteristic which increases its likelihood of having equal sensitivity for different directions of side-impingement of the penetrative radiation.

In the operation of an arrangement such as that shown herein, charged particles which are produced at various points within the cathode array are forcibly propelled through it toward its bottom end and the hemi-spherical open discharge space which lies between it and the anode.

The thickness and proportions of the various elements which appear in the drawing and the spacings between them have been chosen for illustrative simplicity and clarity and are not intended necessarily to be representative of actual dimensions. Likewise no attempt has been made in Fig. 1 to show cross-sectional details of the cathode elements 11—14 since this is not feasible in the small space available.

With regard to proportions which are suitable for the presently disclosed detector 10 the following is noted. According to experience gained in the art of multiple-plate detectors which preceded the disclosures made in the above-mentioned co-pending application, it would not be possible to reduce the spacings between cathode elements of given lengths, diameters, and thicknesses beyond a certain point without adversely effecting the collection of charged particles in-as-much-as this collection would be effected solely by the electro-static attraction of fringing portions of the anode's field. However by using means, such as those proposed in those applications (and the modifications thereof herein), to set up electron accelerating fields in the interelement spacings to supplement those of the anode, the spacings of the cathode plates can be made considerably smaller than was ever previously possible.

In the top end of the cathode array a tightly fitting annular spacer 18 is carried between the elements of each of the adjacent pairs thereof 11—12, 12—13 and 13—14. These elements will serve several useful purposes such as to ruggedize the cathode array, to preserve co-axiality, and to perform an electron-optical function which is to be further described below. In the embodiment shown herein the cathode elements are not very long with respect to their diameters, therefore they are shown to be supported only at their top ends. However where it is desirable to produce elongated cathode arrays the elements may be additionally supported by smaller spacers (i. e., spacers which do not take up the full widths of the interelements spaces for 360°) which may be positioned near their bottom ends and/or at intermediate points, such as cross rods, spacer webs, or any other largely-open structural means whose designs will be obvious to those skilled in the art once the electrical requirements for the cathode array have been fully understood.

According to the present invention electric fields are provided for axial pre-acceleration of negative charged particles which escape into or are produced within the inter-cathode element spacers. These fields may be provided by a modification of the use of auxiliary electrodes taught in the above-mentioned co-pending application, Ser. No. 262,019 and/or of the forcing of currents through, or along the surfaces of, the cathode elements themselves described in the other above-mentioned co-pending application (of Gerhard Herzog).

In order that the annular spacers 18 may be polarized negatively with respect to the cathode array, to thereby function as "reflector" auxiliary electrodes, they should be insulatingly supported with respect to the cathode elements 11—14 and the cover 16. This may be accomplished by applying to the top and side surfaces of each of these spacers insulating coatings, as represented at 19, such as thin glazed-on glass films, coatings of aluminum oxide or of any of a number of other stable and non-gassy di-electric materials known to be suitable. In addition terminal means, such as the terminal pins 21, are provided so that the spacers 18 may be readily connected to an external potential source. Each of the pins 21 may consist of a thin rod of "Kovar" which is conductively connected to a respective spacer by soldering or spot welding and is insulatingly supported in the cover 16 by a glass bead 20.

A foraminous "pre-accelerating" electrode 22 of generally hemi-spherical shape is insulatingly supported within the open end of the element 11 on a ceramic ring 23. This electrode may be fastened to the ring in any of a number of appropriate ways such as by soldering, by riveting or by being press fitted thereinto and in turn the ceramic ring 23 may be similarly supported within the element 11.

A bottom cover 24 for the envelope 15 is attached to the bottom end of the outer element 11 by the use of a turned over lip in a manner already described with respect to the circular cover 16. An anode support rod 25 extends through an opening in the center of the bottom cover 24 being supported therein by a glass bead 26. A punctaform anode 27 having a shape of a sphere of extremely small diameter is carried on the inner end of the rod 25. The exact diameter for the anode 27 may be determined in accordance with known Geiger-Mueller design practices so that any detector whose other parameters are predetermined will have the efficiency vs. anode-voltage characteristic desired for it. Generally speaking ball type anodes should be of larger diameter than the fine wire anodes of proto-type Geiger-Mueller tubes since the concentration of a field about a punctaform anode occurs in an additional dimension and therefore is more intense. Thus the diameters of such fine wire anodes are usually of the order of a few mils while those of polished metal ball anodes are likely to be of one or two millimeters, i. e., 40 to 80 mils. In general the voltage region in which a "plateau" can be obtained is a function of the anode diameter. Thus as the anode potential is increased the plateau starts to develop at the point where the density of the electrons converging upon the anode, this being inversely proportional to the diameter of the small-area anode, has attained a value at which each increment due to a further increase in anode potential neutralizes a substantial part or all of that increase. Beyond this point increases in the applied anode potential effectively give rise to their own cancellation whereby they are ineffectual to increase either the collection of charged-particles (i. e., to increase the anode current or pulse size) or to increase the detection efficiency. The plateau ends when the field gradients about the anode are large enough, they also being inversely proportional to the diameter of the small-area electrode, to cause the onset of a corona discharge. Thus both the beginning and ending of the plateau will occur in lower voltage ranges for smaller anodes. However the voltage range over which the plateau extends will not remain constant as the region in which it occurs is changed. That is to say, as the plateau is moved up and down on the voltage scale (by making the anode diameter larger or smaller) it does not always cover the same voltage range. As a result the designer may sometimes make a choice of anode diameter which will avail a plateau of maximum extension at the cost of being bound to use a particular magnitude of anode voltage. Moreover if the detector shown in Fig. 1 cannot provide a plateau of a desired voltage range for any combination of anode diameter and applied anode potential, one may use a modified form of anode such as the one shown in Fig. 5. This is a compromise between the co-axial fine wire anode of a proto-type Geiger-Mueller tube and the ball anode shown in Fig. 1. In Fig. 5 the anode support is a Y-shaped element comprising a leg 25′ which extends through the bead 26 and the two arms 28 of a Y-shaped support for the ends of a fine wire anode 29 having a central portion which is concentric with the spherical surface of the pre-accelerating electrode 22. It may be noted that the choice of anodes should be made not only with the object of obtaining a desired location for and extension of the plateau but also of obtaining output pulses of a desired amplitude. When a discharge occurs to any point of a Geiger-Mueller anode, such as to a given point of a fine wire anode, the glow of plasma which serves as a virtual cathode to provide electron current to the anode during the pulse rapidly extends along the surface thereof until it engages all effectual portions thereof. Thus as more anode surface is provided the attainable peak current is increased. In other words the peak current is limited by anode saturation and this fact should be borne in mind in choosing the type of anode to be used in any particular application.

A terminal 30 is insulatingly supported in the bottom cover 24, by a bead 31, at a point near the edge of the cover from which an electrical connection can readily be made to the under side of the pre-accelerating electrode 22. The connection is made by the use of a spring 32 which is attached to the inner end of the terminal 30 and is formed to lightly contact the electrode 22 when the bottom cover is assembled onto the outer element 11.

The pre-accelerating fields provided between the annular spacers 18 and the pre-accelerating electrode 22, fields which can be described as push-pull with respect to the potential of the cathode array, are provided by connecting the opposite poles of a source of a direct potential, such as one of 200 volts, between the terminal pins 21, which may be multipled together for the purpose, and the terminal 30 with the latter being connected to the positive pole of the source, and by grounding an intermediate point of the source to the envelope 15. No circuitry for externally providing and controlling potentials to produce these fields or for eliminating or reducing them after the occurrence of each pulse, so as to permit quenching, is shown in the drawing in-as-much-as appropriate circuitry is fully shown and described in the abovementional co-pending application, Ser. No. 262,029.

A supplementary or alternative means for providing longitudinal ("axial") pre-accelerating fields comprises means for forcing currents in directions through or along the surfaces of the cathode array elements 11—14, which correspond to upwards in Fig. 1. Since appropriate circuitry for accomplishing this, as well as components included in said circuitry for eliminating or reducing the fields after the occurrence of each pulse, are fully shown in the other described co-pending application, they likewise are not shown herein nor described in detail. However suitable structures for the elements 11—14 are shown in the Figs. 2–4.

In order that currents may be forced through or along the surfaces of the elements 11—14 to set up pre-accelerating fields within the array two current input terminals are available in the structure shown in Fig. 1. The first, to which the negative side of a direct current source should be connected, may be any part of the envelope 15. This is feasible because the upper end of each of the elements 11—14 is conductively connected to the metallic inner surface of the circular cover 16, this conductive connection may be to the entire surface of the end of the element whether one element is formed of an homogeneous resistive material or comprises a thin surface film of resistive material, as described below. A terminal to which the positive side of a current source should be connected is provided by a terminal pin 33 which extends through an insulating glass-bead support 34 in one side of the element 11. The inside end of the pin 33 is connected in multiple to conductive rims 34 which extend along the bottom ends of all of the elements 11—14. These rims are sufficiently conductive so that even though the connection of each of them to the pin 33 is from a single point, as by the wire 35, nevertheless substantially equal currents will be forced upward through the elements, or along their surfaces, toward the cover 16 for all points around the perimeters of the elements. The conductive rims 34 may be formed in a number of suitable ways, e. g., by applying a coating of aquadag solution or silver paste to the bottom edges of the elements or by sputtering on a material such as gold while the flat sides of the elements are appropriately covered with masks or templates. In the case of the elements 12—14 the rims 34 may cover their entire bottom edges and in fact may even extend slightly up both their inner and outer side surfaces from these edges. However in the case of the outer element 11 the rim 34 should not be wide enough to contact its outer surface in embodiments where that surface is uninsulated metal and therefore might short circuit the top and bottom edges of the element. However, if the outer surface and the bottom edge of the element 11 is coated with an insulating coating before the rim 34 is applied to it or if the element itself is made of insulating or resistive material, this precaution will not be necessary.

Obviously in embodiments in which this precaution is necessary it will also be necessary to insulate the inside surface of the bottom cover 24 from the rim 34. This can be accomplished by leaving a small air space between them when the cover is put on or by the use of a solid insulating spacer inserted between them.

In the simplest type of embodiment each of the cathode elements 11—14 may be made of an homogeneous material of such resistivity per cubic centimeter that for the particular dimensions of the element a desired voltage drop can be maintained axially between its top and bottom edges with the expenditure of a relatively small current.

Figs. 2–4 represent structures for the cathode elements 11—14 which are alternatives to structures of homogeneous resistive materials to make it possible for the elements to have desired high resistances between their top and bottom edges and also to have other characteristics suitable for a G. M. cathode element. The simplest of these is that of Fig. 4. In this embodiment a cathode element comprises an insulating core 36 carrying directly on all of its surfaces (except the outer surface of the outer element 11) an extremely thin film or coating 37 of resistive material. The coating 37, for example, may be of tungsten or other metal which has been evaporated onto the core in such a thin layer, e. g., monomolecular, as to have high resistance values between different points on its surface.

An objection to using large amounts of ordinary resistive or insulating materials, for example, to make the entire elements 11—14 of homogeneous material corresponding to that used for commercial carbon resistors, or to make glass or ceramic insulating cores for the elements, is that the principal ingredients of most suitable kinds of such substances are usually low atomic number elements. However, as is known, such elements are not as capable of absorbing penetrative radiation as high atomic number elements and for this reason their use is not to be preferred for the cathodes of Geiger-Mueller detectors.

While one way of meeting this situation is to use thicker elements, the embodiments shown in Figs. 2 and 3 have been devised to provide cathode elements which, in addition to having high electrical resistance, also comprise large percentages of high atomic number elements. To this end the type of cathode element shown in Fig. 2 comprises a core 38 which may consist entirely of some preferred high atomic number element, such as tantalum, but in addition comprises an intermediate insulating coating 39 to prevent the core from short circuiting the resistive coating 37. The insulating coating 39 may be of any suitable kind such as a coating of aluminum oxide applied over the core 38 as an oxide or, if preferred, applied by evaporating or sputtering a layer of metallic aluminum onto it and then oxidizing all of the exposed surfaces of the layer.

The embodiment of Fig. 3 utilizes a special core 40 which comprises high atomic number particles sintered together in an insulating binder so that there will be no unbroken conductive paths from one point to another either through the core or along its surfaces, even if the particles are individually conductive, as they will be if they are fillings of a metal such as tantalum. Suitable techniques for making the special cores 40 are available in such arts as that related to the manufacture of high-permeability di-electric "Ferrite" cores for high frequency inductors, transformers, and the like. Because of the special construction used for the core 40 the coating 37 may be applied directly over it as shown in Fig. 3, i. e., without the use of an intermediate insulating coating. In this type of embodiment, as in the others, the bottom edge of each element, 11—14 carries a rim 34 to serve a useful purpose which has already been explained.

A detector of the kind shown herein may be operated either with an applied anode potential falling within the voltage range of its plateau or with one of appropriate magnitude for it to operate as a proportional counter. Similarly it may have either a suitably low-pressure gaseous filling to operate as a counter of individual photons of radiation or a suitably high one to operate as an ionization chamber.

Moreover, the cathode array does not necessarily have to be of cylindrically concentric geometry. For example, its elements may be rectangular tubes in nested relationship rather than coaxial cylinders. In fact it may even be composed of a simple bundle of small, uniform-diameter tubular elements constituting a honeycomb type of structure wherein the elongated open spaces which extend from end to end inside the array are no longer annular in shape. All of these alternatives are possible since it is not essential for operativeness of the pre-accelerating means shown herein that the array must necessarily consist of concentric cylinders as such.

Obviously many modifications and variations of the invention, as hereinbefore set forth, may be made without departing from the spirit and scope thereof and, therefore only such limitations should be imposed as are indicated in the appended claims.

I claim:

1. A detector of penetrative radiation comprising a cathode array of hollow tubular elements stacked together with their side surfaces defining open spaces extending within the array lengthwise thereof; an anode having a charged particle receiving surface which is smaller than said side surfaces by a very large factor such as one over 100, the anode being insulatingly supported outside of the array near an end thereof to receive charged particles escaping from the array along said spaces; and means having at least two terminals and responsive upon connection of said terminals to a pre-determined source of electrical energy to provide within the array and along said spaces electrical fields for controlling the movement of charged particles along said spaces from the array to said anode, said last-mentioned means being thus responsive independently of the presence of any potential difference between the cathode array and the anode.

2. A detector as in claim 1 in which said surface of said anode is of substantially spherical configuration.

3. A detector as in claim 1 in which said surface of the anode corresponds in its configuration to that of a curved wire having a very small diameter with respect to the dimensions of the array.

4. A detector as in claim 1 in which at least one of said elements is adapted to offer along one of its surfaces substantial resistance to the flow of electrical current in directions lengthwise of the array and which further comprises terminals for connecting opposite ends of said last mentioned element to a potential source for forcing electrical currents along its said surface in said directions.

5. A detector as in claim 2 in which said insulating core comprises high atomic number particles which may be individually conductive but are electrically isolated by being bound together in an insulating matrix.

6. A detector of penetrative radiation comprising a cathode array including a plurality of tubular elements in nested and spaced-apart relationship in which at least one of the elements is centrally contained within another thereof with its outer side surfaces spaced from the inner side surfaces thereof to define an annular interelement space; an anode having a charged particle receiving surface which is smaller than said side surfaces by a very large factor such as one over 100, the anode being insulatingly supported outside of the array near an end thereof to receive charged-particles escaping from the array along said space; and means having at least two terminals and responsive upon connection of said terminals to a pre-determined source of electrical energy to provide within the array and along said space electrical fields for controlling the movement of charged particles along said space within the array and from it toward said anode, said last-mentioned means being thus responsive independently of the presence of any potential difference between the cathode array and the anode.

7. A detector of penetrative radiation comprising a cathode array of substantially concentric cylindrical elements in nested and spaced apart relationship to define an annular interelement space between each pair of adjacent elements and a cylindrical space within the innermost element; an anode having a charged particle receiving surface which is small with respect to the dimensions of the array by a very large factor such as one over 100, the anode being insulatingly supported outside of the array near an end thereof to receive charged particles escaping from the array along said spaces; and means having at least two terminals and responsive upon connection of said terminals to a predetermined source of electrical energy to provide within the array and along said spaces electrical fields for controlling the movement of charged particles along said spaces within the array and from it toward said anode, said last-mentioned means being thus responsive independently of the presence of any potential difference between the cathode array and the anode.

8. A detector of penetrative radiation comprising a cathode array of hollow tubular elements stacked together with their surfaces defining open spaces extending within the array lengthwise thereof; an anode insulatingly supported outside of the array near an end thereof to receive charged particles escaping from the array along said spaces; means, including at least two external terminals and at least one of said elements, for responding to connection of the terminals to a predetermined source of electrical energy to provide electrical fields within the array, independently of any potential difference between it and the anode, for controlling the movement of charged particles along said spaces toward said anode; at least one of said elements which is included in said means having an insulating core and a thin film of resistive material carried thereon as a coating offering substantial resistance to the flow of electrical current in directions lengthwise of the element, and said two terminals being connected to opposite ends of said element for causing a flow of electrical current through said coating in said lengthwise directions upon their said connection to said source of energy.

9. A detector of penetrative radiation comprising a cathode array of hollow tubular elements stacked together with their surfaces defining open spaces extending within the array lengthwise thereof; an anode insulatingly supported outside of the array near an end thereof to receive charged particles escaping from the array along said spaces; means having at least two terminals and responsive upon connection thereof to a predetermined source of electrical energy to provide within the array and along said spaces electrical fields for controlling the movement of charged particles therealong from the array to said anode, said means comprising an auxiliary electrode supported near one of the ends of said array in insulating relationship to said elements thereof and being thus responsive independently of any potential difference between the array and the anode.

10. A detector as in claim 9 in which said auxiliary electrode is a foraminous pre-accelerating electrode positioned near to said first-mentioned end of the array and between it and the anode.

11. A detector as in claim 9 in which said auxiliary electrode is a reflecting electrode supported at the end of the array opposite to its first-mentioned end.

References Cited in the file of this patent

UNITED STATES PATENTS

| | | |
|---|---|---|
| 2,480,808 | Fearon | Aug. 30, 1949 |
| 2,499,489 | Goldstein et al. | Mar. 7, 1950 |
| 2,519,007 | Wilson | Aug. 15, 1950 |
| 2,546,984 | Deloraine et al. | Apr. 3, 1951 |
| 2,574,632 | Engelkemeier et al. | Nov. 13, 1951 |
| 2,606,295 | Scherbatskoy | Aug. 5, 1952 |
| 2,612,615 | Fehr et al. | Sept. 30, 1952 |

OTHER REFERENCES

"Plain and Beaded Wire Geiger Counters for X-rays," Parrott et al., Rev. of Sci. Inst., vol. 23, #1, January 1952, pp. 1–7.

"Use of a Grid . . . etc.," Korff et al., Rev. of Sci. Inst., August 1940, pp. 267–69.